Feb. 14, 1950 V. J. GRUMBLATT 2,497,668
OVERLOAD LIMITING DEVICE
Filed Oct. 3, 1947
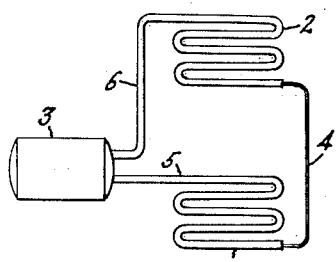
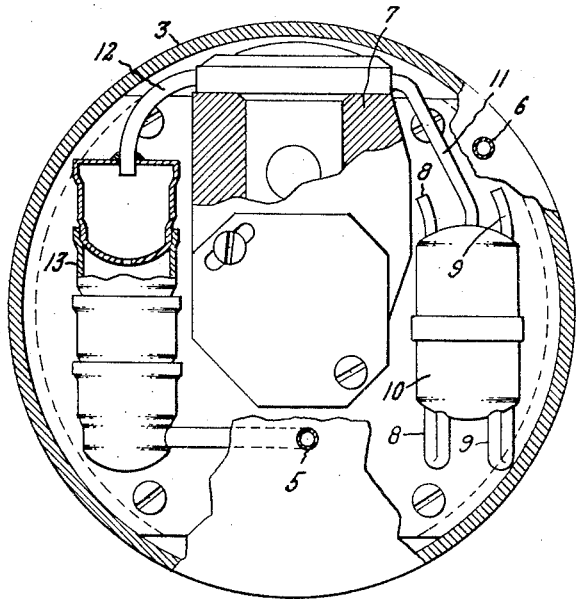
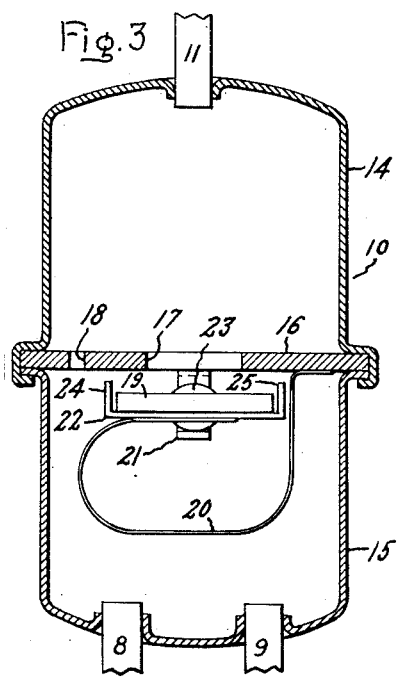
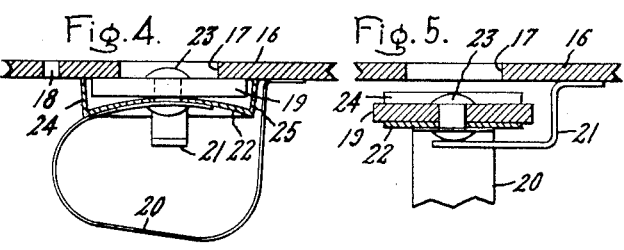
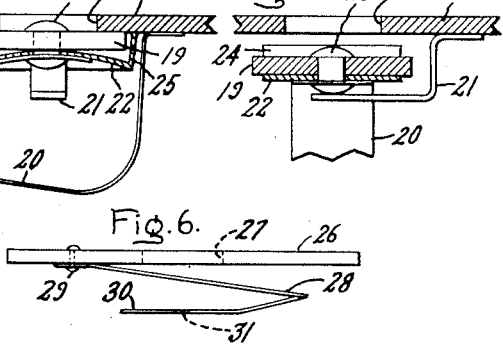
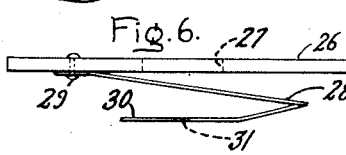
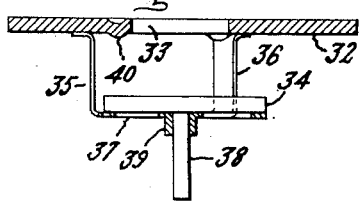
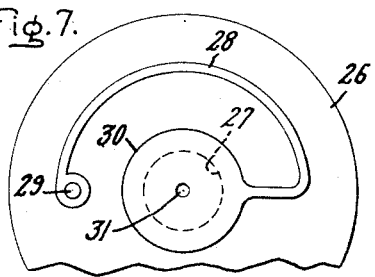
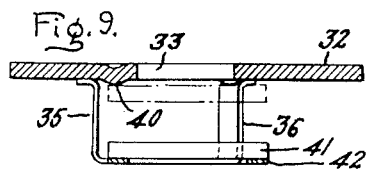
Inventor:
Victor J. Grumblatt,
by Edwin L. Rich
His Attorney.

Patented Feb. 14, 1950

2,497,668

UNITED STATES PATENT OFFICE 2,497,668

OVERLOAD LIMITING DEVICE

Victor J. Grumblatt, Erie, Pa., assignor to General Electric Company, a corporation of New York Application October 3, 1947, Serial No. 777,739

10 Claims. (Cl. 62—115)

My invention relates to overload limiting devices and more particularly to such devices used in connection with refrigerating apparatus for automatically limiting the load on the driving motor.

During pull-down condition a much larger load is imposed on the driving motor of the refrigerating apparatus than is present during the normal operation. This is particularly true in connection with home freezers where the ambient temperature is very much higher than that normally maintained in the freezer and hence pull-down from a substantially ambient temperature imposes a comparatively high load on the motor. It has been necessary to provide motors for refrigerating apparatus with sufficient capacity to operate under pull-down conditions, and this has, of course, necessitated the supplying of a larger and more expensive motor than would be required solely for normal operation of the system. It is, therefore, desirable to provide some arrangement for limiting the load on the motor during pull-down conditions, since the size of the motor could then be determined by the requirements of normal operation and a smaller motor could satisfactorily be used with the refrigerating apparatus.

Accordingly, it is an object of my invention to provide a refrigerating apparatus including an improved arrangement for limiting the load on the driving motor during pull-down to a predetermined maximum.

It is another object of my invention to provide an improved refrigerating apparatus wherein the vaporized refrigerant supplied to the compressor is automatically limited during pull-down.

Further objects and advantages of my invention will become apparent as this description proceeds and the features of novelty which characterize my invention will be pointed out with particularity in the claims annexed to and forming a part of this specification.

For a better understanding of my invention, reference may be had to the accompanying drawing in which Fig. 1 is a schematic representation of a refrigerating system; Fig. 2 is an end view partially broken away of the compressor shown in Fig. 1; Fig. 3 is a sectional elevation view of a portion of Fig. 2 showing details of the overload limiting device; Fig. 4 is a view of a portion of Fig. 3 showing the overload limiting device in its closed position; Fig. 5 is a transverse sectional view of a portion of Fig. 3; Fig. 6 is an elevation view showing a modified form of my invention; Fig. 7 is a plan view of the form shown in Fig. 6; Fig. 8 is a sectional elevation view of another modified form of my invention; and Fig. 9 is a sectional elevation view of still another modified form of my invention.

Briefly, the overload limiting device is associated with the intake of the compressor and is arranged to limit the amount of vaporized refrigerant which is permitted to pass to the compressor. This is accomplished by providing a valve in the intake passage which is spring-biased to open position against the flow of the vaporized refrigerant and closes to reduce the passage available for vaporized refrigerant under conditions which would otherwise impose an overload on the motor.

Referring now to Fig. 1, there is shown a refrigerating system including a condenser 1, an evaporator 2, and a motor-compressor unit (not shown), which is contained within a hermetically sealed case 3. The flow of refrigerant from the condenser to the evaporator is controlled by a restrictor tube 4. Compressed refrigerant is supplied to the condenser from the motor-compressor unit through a conduit 5, and vaporized refrigerant is returned to the case 3 from the evaporator through a conduit 6. The vaporized refrigerant returned to the case then passes to the compressor through an intake muffler and an overload limiting device arranged within the case. The construction and arrangement of the muffler and the overload limiting device or valve for limiting the load on the motor are hereinafter described in detail.

Referring now to Fig. 2, there is shown a compressor 7 within the hermetically sealed case 3, the compressor being driven by a suitable motor (not shown). Vaporized refrigerant, which is supplied to the interior of the case through the conduit 6, passes through tubes 8 and 9 to an intake muffler 10, and this vaporized refrigerant then passes through a conduit 11 to the compressor. Compressed refrigerant is discharged from the compressor through a conduit 12 into an exhaust muffler 13, and passes from the exhaust muffler to the condenser through the conduit 5.

In order to limit the load on the motor, an overload limiting device is provided within the intake muffler. Referring to Fig. 3, the intake muffler is composed of two complementary portions, an upper portion 14 and a lower portion 15. These portions are provided with cooperating flanges at their adjacent edges and are joined together by welding or in any other suitable manner. A partition element 16 is positioned within the intake muffler and is secured in place between the two complementary portions 14 and 15. In order to provide for passage of vaporized refrigerant through the intake muffler, the partition element 16 is provided with two openings 17 and 18. During normal operation, substantially all of the vaporized refrigerant passes through the larger opening 17 at the center of the baffle. The size of the smaller opening 18 is chosen so as to limit the amount of vaporized refrigerant which may pass through the intake muffler during pull-down conditions and thereby to limit the load on the motor to the maximum load encountered during normal operation. A valve 19 is provided for controlling the opening 17. This valve is normally biased downwardly in a direction opposite to the direction of flow of the vaporized refrigerant through the intake muffler by a resilient member or spring 20. In order to position the valve relative to the opening, a stop 21 is provided, the stop being secured to the under side of the partition element 16 by welding or in any other suitable manner, as shown more clearly in Fig. 5. The use of the stop permits a preloading of the spring 20 so that no movement of the valve occurs except under overload conditions. A second resilient member or spring 22 is provided in conjunction with the valve 19 to assist in moving the valve from its closed to its open position. The spring 22 and the valve 19 are mounted on the end of the spring 20 by a rivet 23 or other suitable fastening device. The spring 22 is made of any suitable resilient material and includes two arms 24 and 25 which extend upwardly beyond the top of the valve 10. As shown more clearly in Fig. 4, when the valve is moved toward its closed position, the tips of the arms 24 and 25 come in contact with the lower side of the partition element 16 causing the flat portion of the spring 22 to bow, thereby loading the spring.

The operation of the overload limiting device is as follows. Under normal operating conditions, the valve 19 remains in the open position shown in Fig. 3 and the limiting device has no effect on the operation of the refrigerating system. The force tending to close the valve is proportional to the square of the velocity of the gas passing through the intake muffler, to the density of the gas, and to the area of the valve 19. The velocity is substantially constant since the compressor runs at a relatively constant speed and has a constant displacement, and, of course, the area of the valve does not vary during operation. Accordingly, the force tending to close the valve varies as the density of the vaporized refrigerant. The density in turn is dependent upon the temperature of the refrigerant in the evaporator. For example, with one type of apparatus the conditions might be as follows. During normal operating conditions when the temperature of the vaporized refrigerant does not rise above say 20 degrees F., the pressure tending to close the valve is not sufficient to overcome the force of the spring 20 tending to hold the valve open. However, should the temperature rise considerably above the normal range, for example, to 100 degrees F. which might be encountered during pull-down conditions, there is a corresponding increase in the density of the gas and hence an increase in the force tending to close the valve. The preloading of the spring 20 is chosen so that its force is overcome by a closing force exerted by flowing refrigerant of a predetermined maximum density corresponding to a predetermined maximum temperature, thereby limiting the load on the motor.

When the valve moves to the closed position shown in Fig. 4, the spring 22 is loaded as previously explained; the strength of the spring 22 is such that it allows the valve to move to the closed position at the same temperature at which the force of the spring 20 is overcome. With the valve in the closed position, the passage for vaporized refrigerant is reduced to the small opening 18 and the amount of vaporized refrigerant passing through the intake muffler, and hence the load on the motor, is correspondingly limited. When the temperature of the vaporized refrigerant has been reduced to a predetermined value, for example, 15 degrees F., the density is sufficiently low that the combined force of the spring 20 and the spring 22 overcomes the differential in pressure on the lower and the upper sides of the valve 19, and the valve is moved to its open position.

It can be seen that, without the overload limiting device, a motor of sufficient size to accommodate the load existing under the high temperature pull-down conditions would have to be supplied; however, with the arrangement described above the load on the motor is automatically limited during pull-down conditions and hence a motor which has sufficient capacity merely for normal operating conditions is sufficient. While for convenience the overload limiting device has been shown in the intake muffler, it is obvious that it may be placed at any point in the conduit through which refrigerant is supplied to the compressor. Where the hermetically sealed case is on the high side of the system, for example, the overload limiting device should be arranged in the conduit between the evaporator and the compressor.

Another form of my invention, in which the smaller opening is in the valve, is shown in Figs. 6 and 7. Referring to these figures, a partition element 26, which corresponds to the partition element 16 shown in Fig. 3, is provided. The partition element 26 includes a single central opening 27 for the passage of the vaporized refrigerant from the lower portion to the upper portion of the intake muffler. A resilient member or spring 28 is secured to the partition element 26 by a rivet 29 or other suitable fastening device. The end of the spring 28 is formed to provide a valve 30, which is normally positioned below and in line with the opening 27. The valve 30 is in the form of a flat disk somewhat larger than the opening 27 and is provided with a small opening 31 in the center thereof.

The operation of the overload limiting device shown in Figs. 6 and 7 is similar to that previously described in connection with Figs. 3, 4, and 5 except that it remains closed until the compressor stops at the end of the pull-down operating period. During the subsequent, or normal, operating cycles the valve remains open during both on and off periods. Thus under normal operating conditions the valve member 30 remains spaced from the partition element 26 and vaporized refrigerant is allowed to pass through the opening 27. When the temperature rises above a predetermined value, as under pull-down conditions, the corresponding increase in density of the refrigerant effects an increase in the upward pressure against the valve member 30. This overcomes the force exerted by the resilience of the spring 28 and the valve member is moved to its closed position in contact with the lower side of the partition element 26. The load on the motor is then limited by the amount of vaporized refrigerant which is able to pass through the small opening 31. The opening 31 is sufficiently large to enable the temperature of the evaporator to be reduced sufficiently to trip off the unit. When the unit stops, the valve member 30 reverts to the open position and remains there until such time as the temperature and density of the refrigerant and hence the upward pressure on the valve again exceed the predetermined valve.

In Fig. 8 there is illustrated a modified form of my invention in which gravity is substituted for the force of the springs shown in the previous forms and in which the second opening is replaced by a spacing of the valve from its seat under pull-down conditions. In this modification, a partition element 32 is employed, this partition element corresponding to the partition element 16 shown in Fig. 3. The partition element 32 is provided with a central opening 33 for the passage of vaporized refrigerant from the lower portion to the upper portion of the intake muffler. In order to limit the amount of vaporized refrigerant which may pass to the compressor under overload conditions, a valve 34 is provided. This valve is positioned below and in line with the opening 33 by a cage 35 which is secured to the underside of the partition element 32. The cage 35 includes a plurality of depending arms 36 within which the valve 34 is positioned and a plurality of horizontal arms 37 upon which the valve is supported in its open position. In order to guide the valve for movement within the cage, the valve is provided with a stem 38 which is arranged to slide within a boss 39 supported on the horizontal arms 37. In order to provide a space between the valve and the partition element 32 in the upper extreme position of the valve for the passage of the predetermined minimum amount of vaporized refrigerant during pull-down conditions, the under side of the partition element adjacent the opening 33 is provided with a plurality of projections or stops 40. These projections may be formed, for example, by suitably indenting the partition element 32.

The operation of this form of my invention is substantially the same as that of the modification just described with the exception that the weight of the valve itself is utilized to move the valve to its open position. Under pull-down conditions when the temperature exceeds a predetermined value, the pressure on the valve, because of the increased density of the vaporized refrigerant, becomes sufficient to overcome the weight of the valve, and the valve is moved upwardly into contact with the projections 40. In this position of the valve, the amount of vaporized refrigerant is limited to the amount which may pass through the restricted space between the upper face of the valve 34 and the lower side of the partition element 32. The load on the motor is thereby limited. When the unit stops at the completion of the pull-down operating period, the valve moves to its open position, and it continues to occupy this position during both the on and off periods of the subsequent normal operating cycles. Should the temperature again exceed the predetermined value at any time, the valve again closes to reduce the amount of refrigerant passing through the muffler to the compressor.

The modified form of my invention shown in Fig. 9 is similar to that shown in Fig. 8 with the exception that the guide stem 38 is omitted. A valve 41 which is in the form of a disk is suspended below and in line with the opening 33 by the cage 35, which consists of a plurality of depending arms 36 and an integral supporting ring 42. Under pull-down conditions the valve 41 is moved to the partially closed position shown by the dotted lines, wherein the passage for vaporized refrigerant is reduced to the space between the upper face of the valve 41 and the lower side of the partition element 32. The valve, like that shown in Fig. 8, remains in the closed position until the termination of the operating period of the pull-down cycle.

While I have shown and described specific embodiments of my invention, I do not desire my invention to be limited to the particular constructions shown, and I intend by the appended claims to cover all modifications within the spirit and scope of my invention.

What I claim as new and desire to secure by Letters Patent of the United States, is:

1. A refrigerating system including a compressor and an evaporator, means including a conduit for conveying refrigerant from said evaporator to said compressor, said compressor being adapted to move refrigerant through said conduit at a substantially constant velocity regardless of the density of the refrigerant, a partition element within said conduit having at least one opening therein defining a passage for refrigerant, a valve for reducing the size of said passage, said valve being disposed on the evaporator side of said partition element and in the path of the refrigerant flowing through said conduit, the refrigerant in flowing through said conduit exerting a closing force on said valve proportional to the density of the refrigerant, and holding means for retaining said valve in its open position, said holding means having an effective force less than the closing force exerted by the flowing refrigerant when the density of the refrigerant exceeds a predetermined maximum.

2. A refrigerating system including a compressor and an evaporator, means including a conduit for conveying refrigerant from said evaporator to said compressor, said compressor being adapted to move refrigerant through said conduit at a substantially constant velocity regardless of the density of the refrigerant, a partition element within said conduit having at least one opening therein defining a passage for refrigerant, a valve for reducing the size of said passage, and means for holding said valve normally spaced from said partition element in the path of refrigerant flowing through said conduit, said valve being movable to its closed position, the movement of said valve to its closed position being effected solely by the force exerted by refrigerant of greater than a predetermined maximum density flowing through said conduit.

3. A refrigerating system including a compressor and an evaporator, means including a conduit for conveying refrigerant from said evaporator to said compressor, said compressor being adapted to move refrigerant through said conduit at a substantially constant velocity regardless of the density of the refrigerant, a partition element within said conduit having a plurality of openings therein for the passage of refrigerant, a valve for closing one of said openings, said valve being disposed on the evaporator side of said partition element and in the path of the refrigerant flowing through said conduit, the refrigerant in flowing through said conduit exerting a closing force on said valve proportional to the density of the refrigerant, and holding means for retaining said valve in its open position, said holding means having an effective force less than the closing force exerted by the flowing refrigerant when the density of the refrigerant exceeds a predetermined maximum.

4. A refrigerating system including a compressor and an evaporator, means including a conduit for conveying refrigerant from said evaporator to said compressor, said compressor being adapted to move refrigerant through said conduit at a substantially constant velocity regardless of the density of the refrigerant, a partition element within said conduit having an opening therein, a valve for covering said opening, said valve having an opening therein smaller than said first-mentioned opening for permitting reduced flow of refrigerant, said valve being disposed on the evaporator side of said partition element and in the path of the refrigerant flowing through said conduit, the refrigerant in flowing through said conduit exerting a closing force on said valve proportional to the density of the refrigerant, and holding means for retaining said valve in its open position, said holding means having an effective force less than the closing force exerted by the flowing refrigerant when the density of the refrigerant exceeds a predetermined maximum.

5. A refrigerating system including a compressor and an evaporator, means including a conduit for conveying refrigerant from said evaporator to said compressor, said compressor being adapted to move refrigerant through said conduit at a substantially constant velocity regardless of the density of the refrigerant, a partition element within said conduit having a plurality of openings therein for the passage of refrigerant therethrough, a valve for closing one of said openings, said valve being disposed on the evaporator side of said partition element in the path of the refrigerant flowing through said conduit, the refrigerant in flowing through said conduit exerting a closing force on said valve proportional to the density of the refrigerant, a stop for said valve spaced from said partition element on the evaporator side thereof, a resilient member for holding said valve normally against said stop, said resilient member having an effective force less than the closing force exerted by the flowing refrigerant when the density of the refrigerant exceeds a predetermined maximum.

6. A refrigerating system including a compressor and an evaporator, means including a conduit for conveying refrigerant from said evaporator to said compressor, said compressor being adapted to move refrigerant through said conduit at a substantially constant velocity regardless of the density of the refrigerant, a partition element within said conduit having an opening therein for the passage of refrigerant therethrough, and a valve for partially closing said opening, said valve being positioned on the evaporator side of said partition element in the path of refrigerant flowing through said conduit and being normally gravity-biased to an open position spaced from said partition element, the refrigerant in flowing through said conduit exerting a closing force on said valve proportional to the density of the refrigerant, the weight of said valve being less than the closing force exerted by the flowing refrigerant when the density of the refrigerant exceeds a predetermined maximum.

7. A refrigerating system including a compressor and an evaporator, means including a conduit for conveying refrigerant from said evaporator to said compressor, said compressor being adapted to move refrigerant through said conduit at a substantially constant velocity regardless of the density of the refrigerant, a partition element within said conduit having a plurality of openings for the passage of refrigerant therethrough, a valve for closing one of said openings, a resilient member for holding said valve normally spaced from said partition element on the evaporator side thereof and in the path of refrigerant flowing through said conduit, the refrigerant in flowing through said conduit exerting a closing force on said valve proportional to the density of the refrigerant, said resilient member having an effective force less than the closing force exerted by the flowing refrigerant when the density of the refrigerant exceeds a predetermined maximum, and a second resilient member for urging said valve toward its open position, said second resilient member becoming effective when said valve moves to its closed position.

8. A refrigerating system including a compressor and an evaporator, means including a conduit for conveying refrigerant from said evaporator to said compressor, said compressor being adapted to move refrigerant through said conduit at a substantially constant velocity regardless of the density of the refrigerant, a partition element within said conduit having a plurality of openings for the passage of refrigerant therethrough, a valve for closing one of said openings, said valve being disposed on the evaporator side of said partition element in the path of the refrigerant flowing through said conduit, the refrigerant in flowing through said conduit exerting a closing force on said valve proportional to the density of the refrigerant, a stop for said valve spaced from said partition element on the evaporator side thereof, a resilient member for holding said valve normally against said stop in opposition to the closing force exerted by the refrigerant flowing through said conduit, said resilient member having an effective force less than the closing force exerted by the flowing refrigerant when the density of the refrigerant exceeds a predetermined maximum, and a second resilient member mounted on said valve for engaging said partition element in the closed position of said valve to urge said valve toward its open position.

9. A refrigerating system including a compressor and an evaporator, means including a conduit for conveying refrigerant from said evaporator to said compressor, said compressor being adapted to move refrigerant through said conduit at a substantially constant velocity regardless of the density of the refrigerant, a partition element within said conduit having an opening therein for the passage of refrigerant therethrough, a valve for partially closing said opening positioned on the evaporator side of said partition element in the path of the refrigerant flowing through said conduit, a valve cage depending from said partition element on the evaporator side thereof, means providing a stop on the evaporator side of said partition element adjacent said opening and said cage, said valve normally occupying a position supported by said cage and substantially spaced from said partition element to permit unimpeded flow of refrigerant through said opening, said valve being movable by the closing pressure exerted by the refrigerant flowing through said conduit when the density of the refrigerant is greater than a predetermined maximum to a second position in contact with said stop means for partially closing said opening to limit the amount of refrigerant passing therethrough.

10. A refrigerating system including a motor-driven compressor and an evaporator, means including a conduit for conveying refrigerant from said evaporator to said compressor, said compressor being adapted to move refrigerant through said conduit at a substantially constant velocity regardless of the density of the refrigerant, a partition element within said evaporator having two openings of different sizes for the passage of refrigerant therethrough, the smaller opening being of such size as to limit the refrigerant passing therethrough to an amount insufficient to overload the motor, a valve for closing the larger of said openings, the refrigerant in flowing through said conduit exerting a closing force on said valve proportional to the density of the refrigerant, and means for holding said valve normally spaced from said partition element on the evaporator side thereof in the path of the refrigerant flowing through said conduit, said holding means having an effective force less than the closing force exerted by the flowing refrigerant when the density of the refrigerant reaches a value sufficient to overload the motor.

VICTOR J. GRUMBLATT.

REFERENCES CITED

The following references are of record in the file of this patent:

UNITED STATES PATENTS

| Number | Name | Date |
|---|---|---|
| 484,526 | Valentine | Oct. 18, 1892 |
| 506,564 | Stulp | Oct. 10, 1893 |
| 542,024 | McIlhenny | July 2, 1895 |
| 2,000,965 | Lipman | May 14, 1935 |
| 2,053,290 | Kaufman | Sept. 8, 1936 |